United States Patent
Gasparik et al.

(10) Patent No.: US 6,560,716 B1
(45) Date of Patent: May 6, 2003

(54) SYSTEM FOR MEASURING DELAY OF DIGITAL SIGNAL USING CLOCK GENERATOR AND DELAY UNIT WHEREIN A SET OF DIGITAL ELEMENTS OF CLOCK GENERATOR IDENTICAL TO A SET OF DIGITAL ELEMENTS OF DELAY UNIT

(75) Inventors: Frank Gasparik, Monument, CO (US); Paul J. Smith, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/437,464

(22) Filed: Nov. 10, 1999

(51) Int. Cl.[7] ................................................ G06F 1/04
(52) U.S. Cl. .................. 713/600; 713/401; 713/502; 327/153; 327/159
(58) Field of Search ..................... 713/400, 401, 713/500, 502, 503, 600; 709/237, 249; 327/141, 151, 153, 156, 160, 161, 265, 266, 276, 277, 159

(56) References Cited

U.S. PATENT DOCUMENTS

| | | | | |
|---|---|---|---|---|
| 4,958,274 A | * | 9/1990 | Dutton et al. ............... | 713/600 |
| 5,018,169 A | * | 5/1991 | Wong et al. .................. | 327/159 |
| 5,459,402 A | * | 10/1995 | Ueno et al. ................... | 324/617 |
| 5,808,494 A | * | 9/1998 | Chang et al. ................ | 327/115 |
| 5,841,307 A | * | 11/1998 | Yamazaki ..................... | 327/265 |
| 6,025,745 A | * | 2/2000 | Lee et al. ..................... | 327/277 |
| 6,157,231 A | * | 12/2000 | Wasson ....................... | 327/156 |
| 6,218,880 B1 | * | 4/2001 | Relph ........................... | 327/277 |
| 6,268,753 B1 | * | 7/2001 | Sandusky .................... | 327/266 |

* cited by examiner

*Primary Examiner*—Thomas Lee
*Assistant Examiner*—Thuan Du
(74) *Attorney, Agent, or Firm*—Carstens, Yee & Cahoon LLP

(57) ABSTRACT

A method and apparatus for a propagation delay and time calibration. The apparatus includes a ring oscillator having a first set of elements. The apparatus also includes delay units. The ring oscillator is used to generate a clock signal used to measure the delay in signals received at the delay blocks. In the depicted examples, the clock signal generated by the ring oscillator is used to run a counter that counts the delay between a transition in a data signal and a reference signal. Each of the delay units includes a second set of elements matching those of the first set of elements in the ring oscillator. The elements in the set of elements are selected such that they track the period of the ring oscillator signal generated by the ring oscillator. The delay units are used to implement the desired delay.

26 Claims, 11 Drawing Sheets

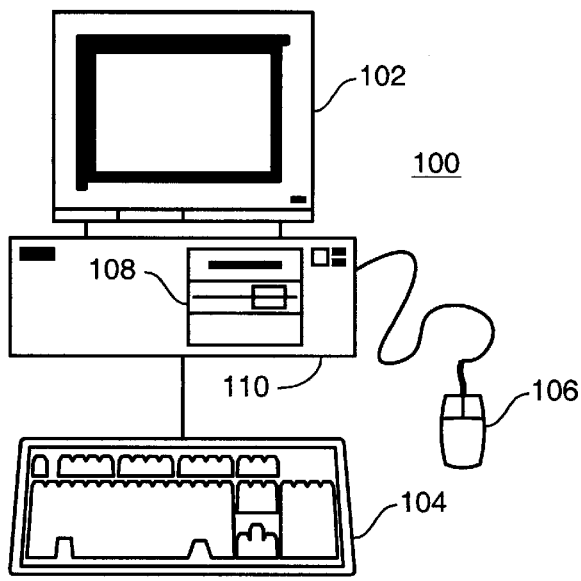
FIG._1
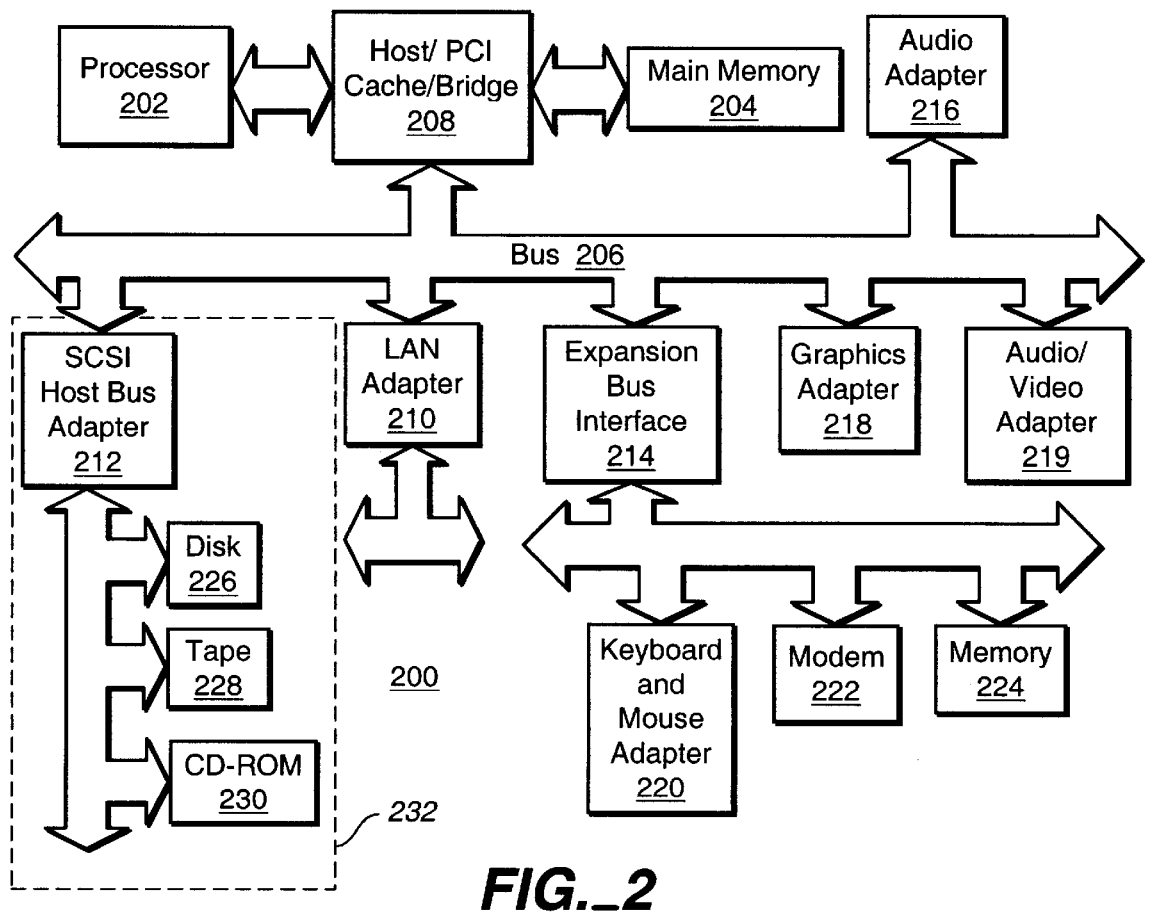
FIG._2

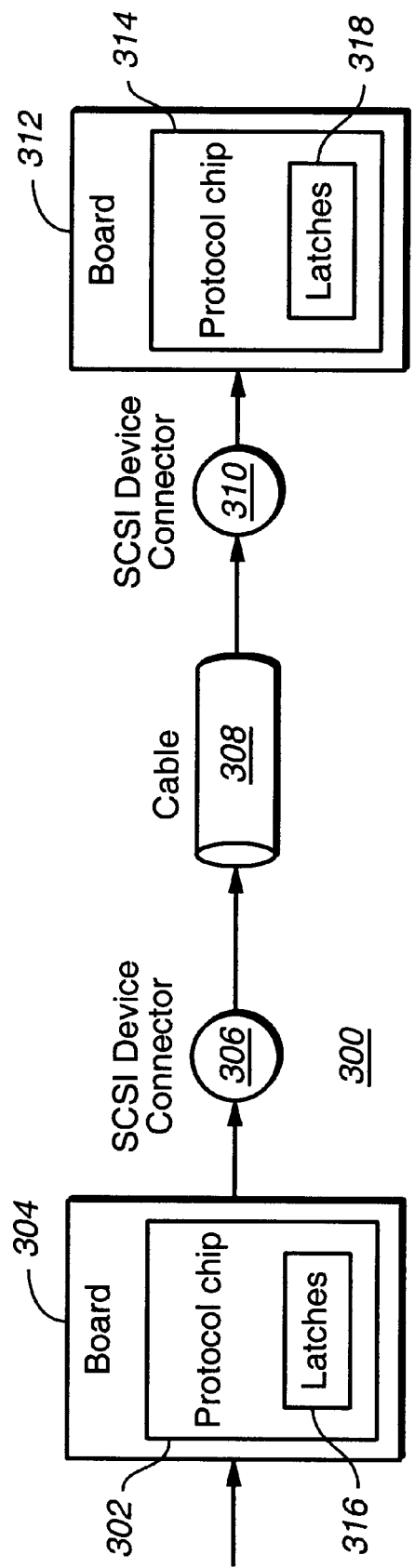
FIG._3

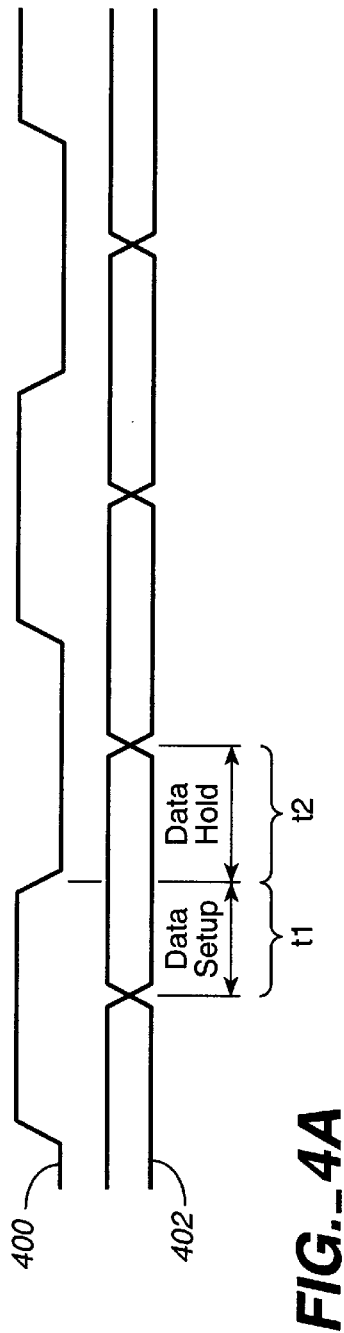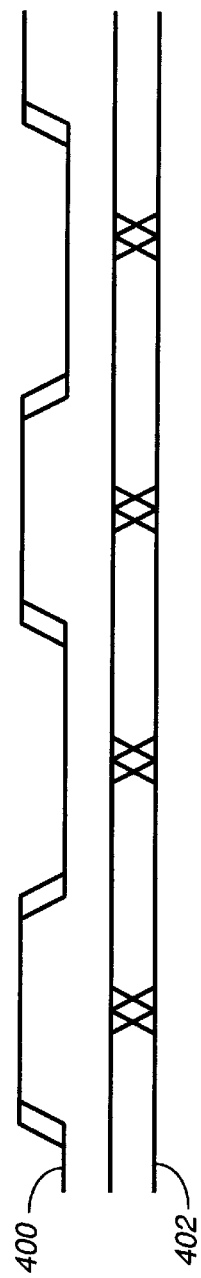

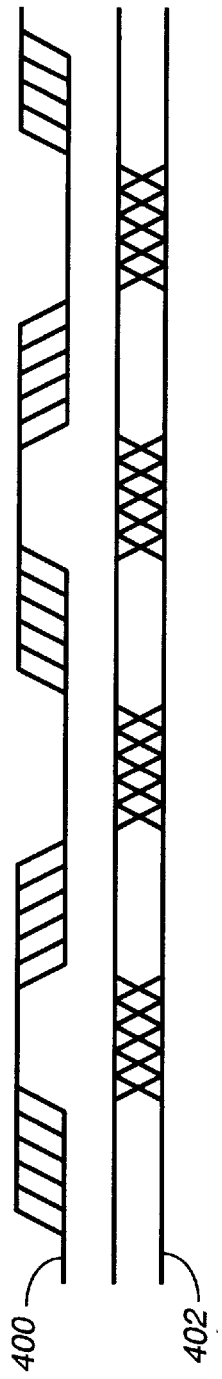
FIG._4C
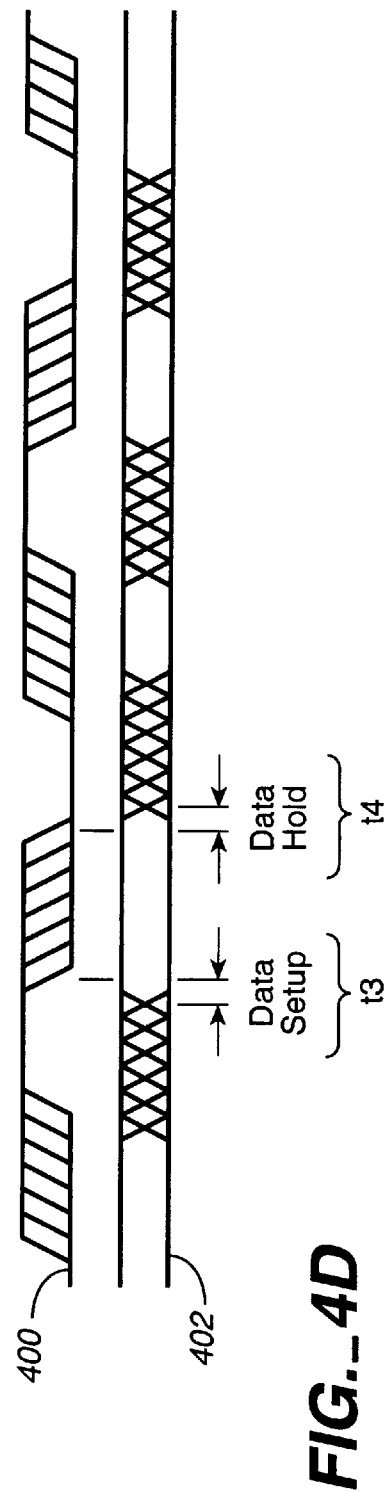
FIG._4D

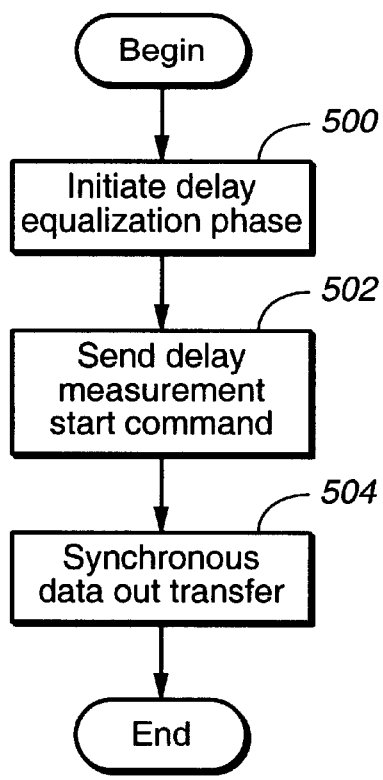
FIG._5
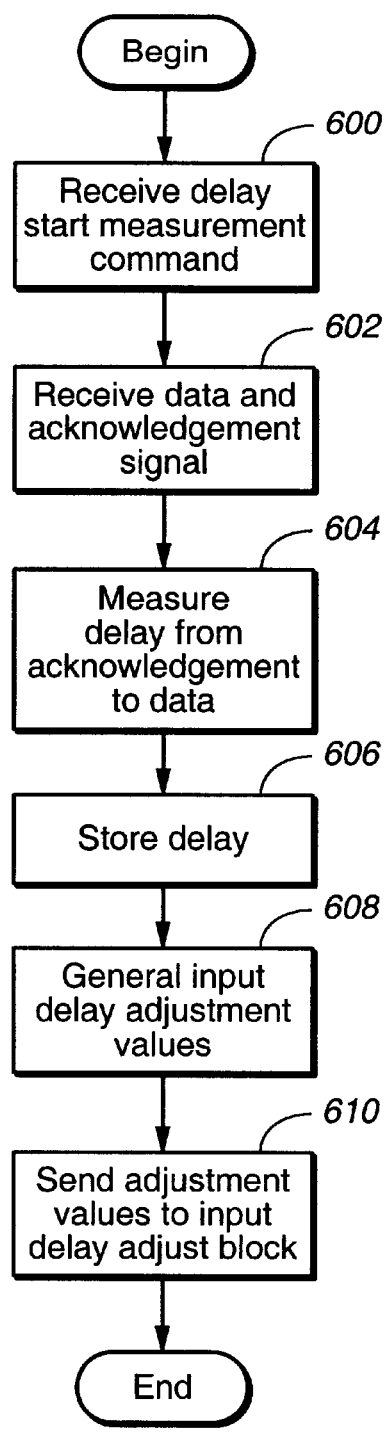
FIG._6

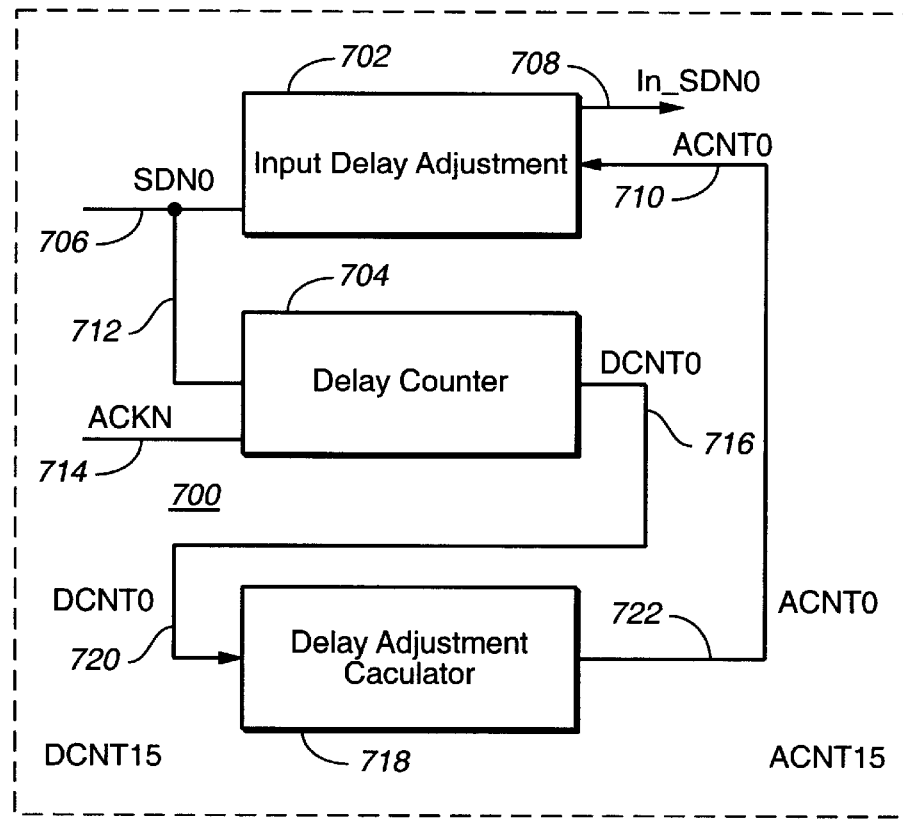
FIG._7
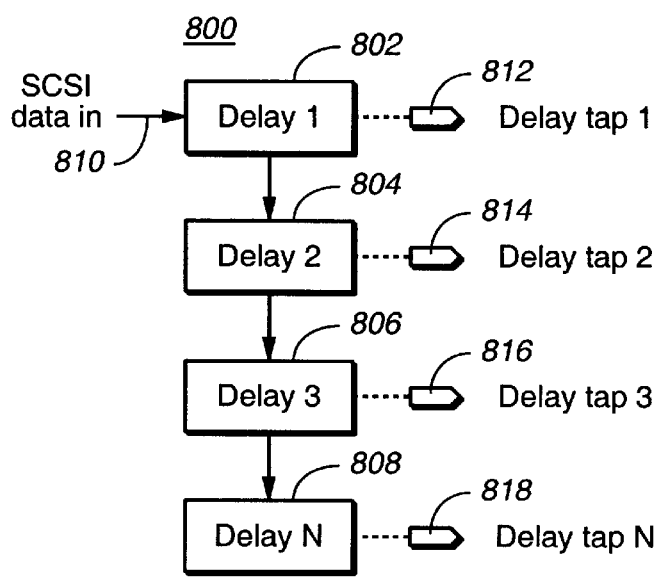
FIG._8

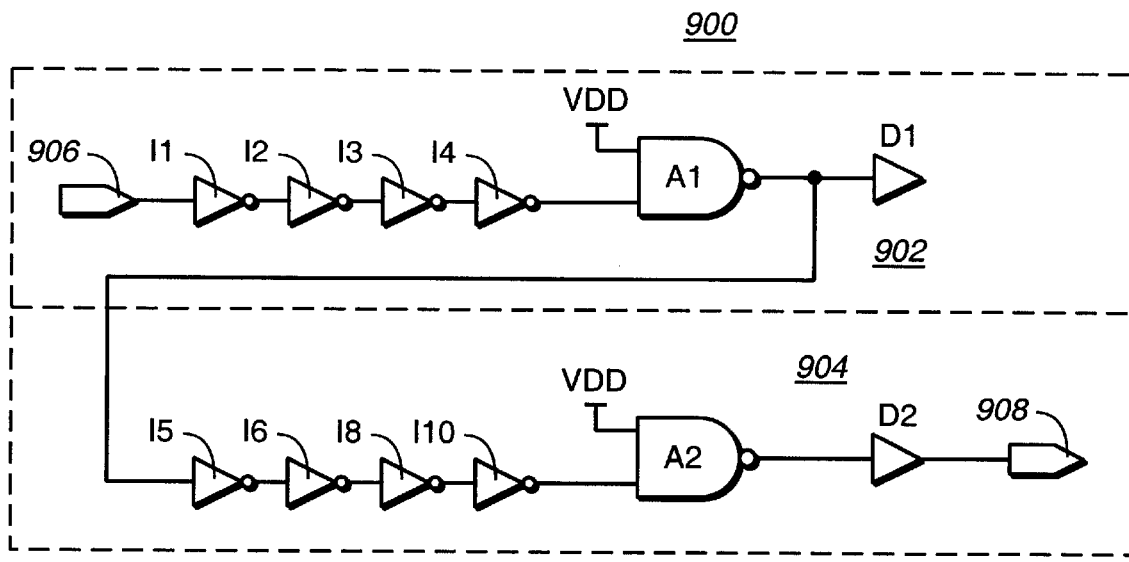
FIG._9
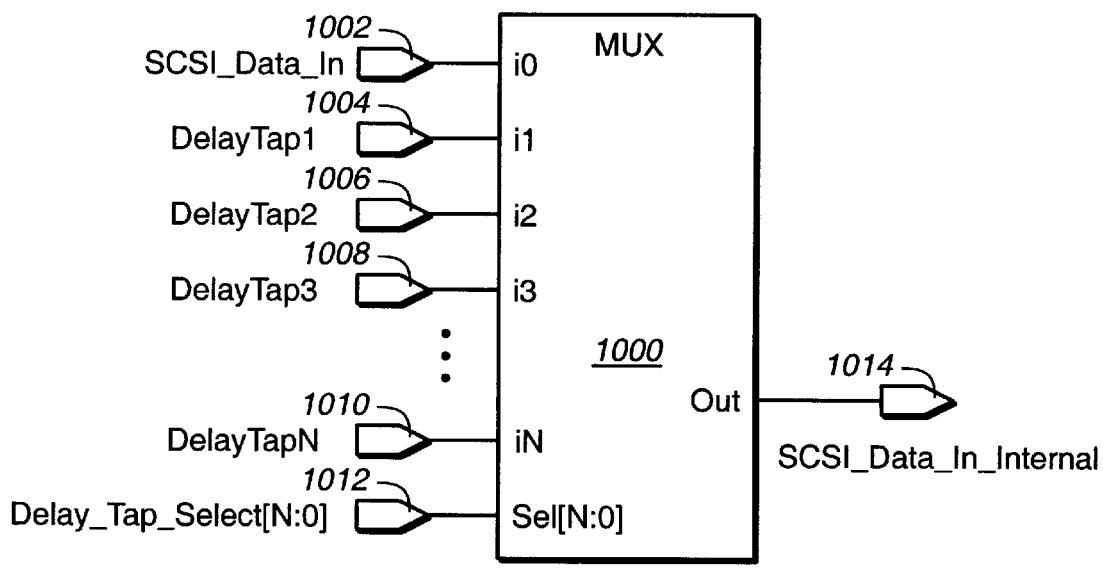
FIG._10

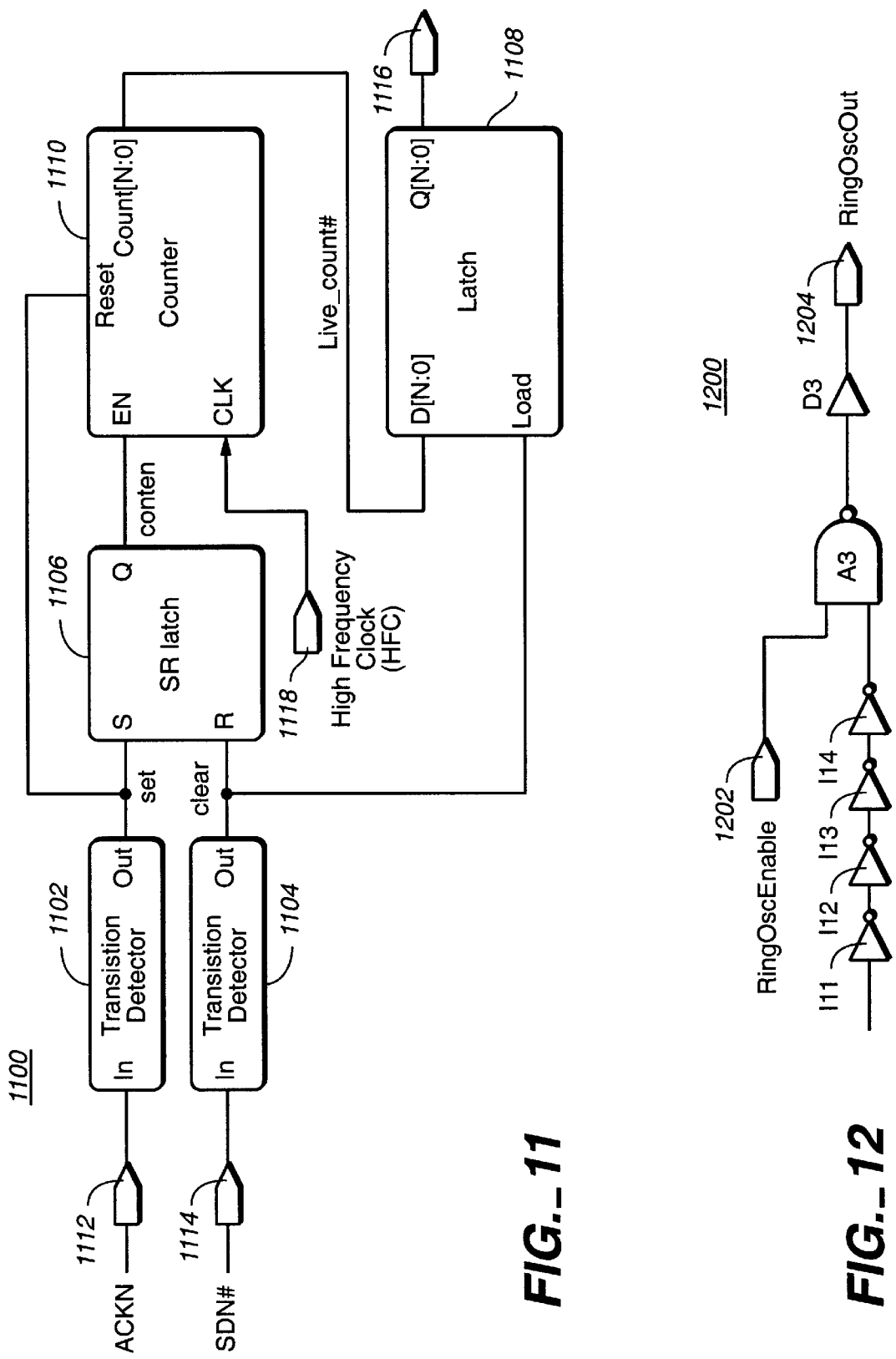
*FIG._11*
*FIG._12*

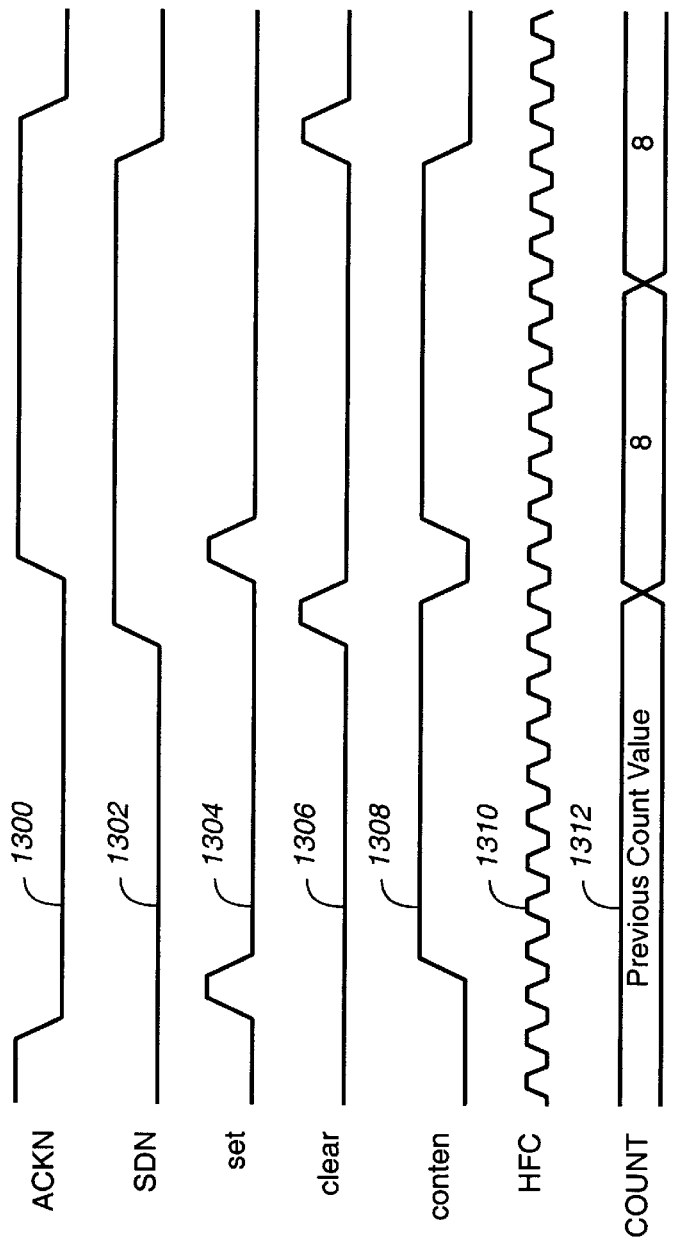
FIG._13
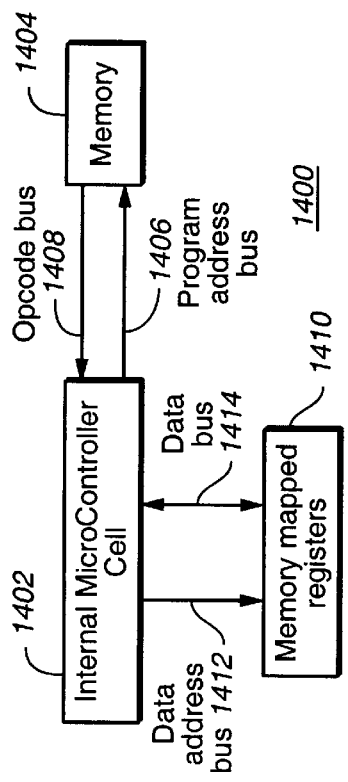
FIG._14

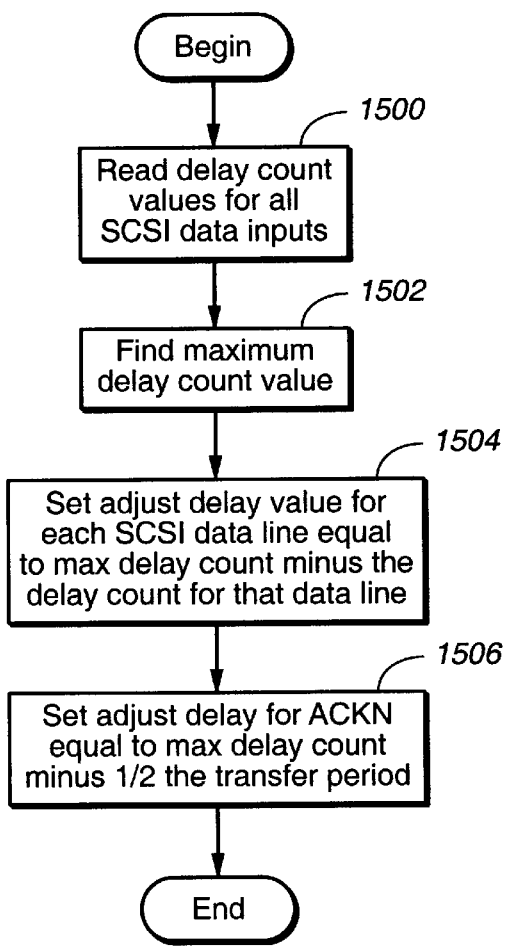
FIG._15
| Pin | COUNT DELAY (DCNT#) | Delay Adjustment (ACNT#) |
|---|---|---|
| SDN0 | 4 | +5 |
| SDN1 | 5 | +4 |
| SDN2 | 3 | +6 |
| SDN3 | 8 | +1 |
| SDN4 | 6 | +3 |
| SDN5 | 4 | +5 |
| SDN6 | 6 | +3 |
| SDN7 | 3 | +6 |
| SDP0 | 7 | +2 |
| SDN8 | 8 | +1 |
| SDN9 | 5 | +4 |
| SDN10 | 2 | +7 |
| SDN11 | 6 | +3 |
| SDN12 | 8 | +1 |
| SDN13 | 7 | +2 |
| SDN14 | 9 | - |
| SDN15 | 2 | +7 |
| SDP1 | 4 | +5 |
| ACKN | 0 | +4 |
FIG._16

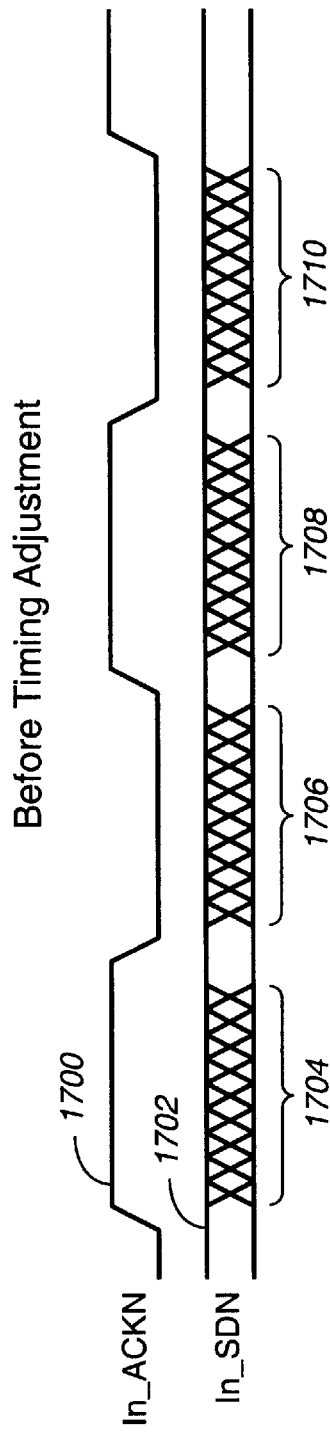
FIG._17A
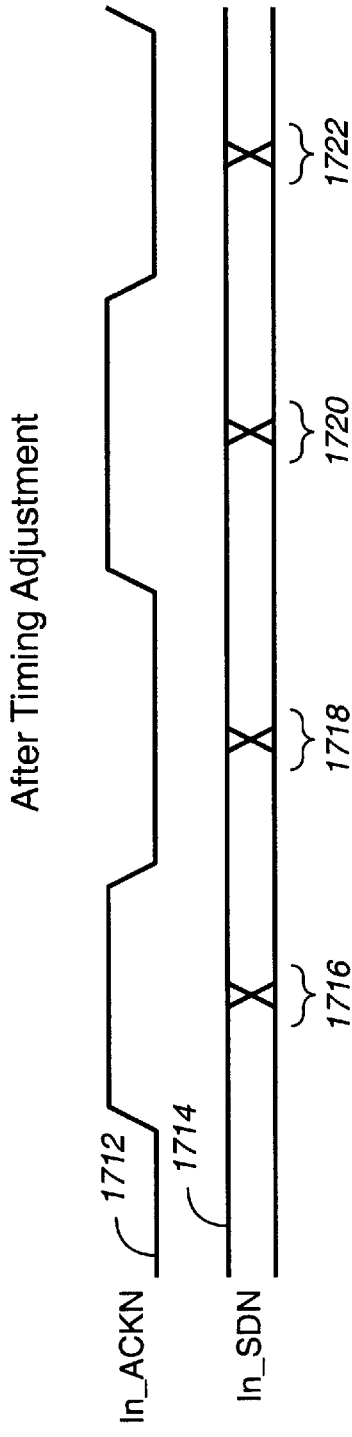
FIG._17B

SYSTEM FOR MEASURING DELAY OF DIGITAL SIGNAL USING CLOCK GENERATOR AND DELAY UNIT WHEREIN A SET OF DIGITAL ELEMENTS OF CLOCK GENERATOR IDENTICAL TO A SET OF DIGITAL ELEMENTS OF DELAY UNIT

CROSS REFERENCE TO RELATED APPLICATIONS

The present invention is related to application entitled METHOD AND APPARATUS FOR MULTI-CHANNEL DATA DELAY EQUALIZATION, Ser. No. 09/437,454, which is filed even date hereof, assigned to the same assignee, and incorporated herein by reference.

BACKGROUND OF THE INVENTION

1. Technical Field

The present invention relates generally to electrical circuitry and in particular to a apparatus for use in speed calibration and propagation delay.

2. Description of the Related Art

Delay elements are constructed from various logic functions such as inverters, for insertion of predetermined delay in signal path. If the system requires a multitude of these delay cells for parallel data transmission, these elements are subjected to effects of temperature, power supply voltage, manufacturing process and on-chip mismatches among these individual cells.

Delay elements are widely utilized in various data transmission systems. Their main application is the insertion of known time interval into the signal path to either increase delay or to modify the signal shape, such as duty cycle and period. All delay elements take advantage of intrinsic propagation delay through the transistors. Transistor size adjustments (width, length) and operating conditions (capacitive load, temperature, voltage supply, etc.) will result in some degree control of signal delay. The manufacturing process causes chip-to-chip variations in delay elements.

With very large scale integration, the die size also plays an important role due to performance variations across the chip. These variations come from non-uniformity of implantation, optical distortion, alignment, mask imperfections, etc., all encountered in the course of chip manufacturing.

One additional and significant cause of delay variations are thermal gradients across the chip with non-uniformly distributed power dissipation of certain functions such as clock and bus drivers. As the power dissipation varies in time by changing the driving sources, the thermal gradient will change the intended signal delays among the data channels. Therefore, it would be advantageous to have an improved delay mechanism for data channels.

SUMMARY OF THE INVENTION

The present invention provides a method and apparatus for a propagation delay and time calibration. The apparatus includes a ring oscillator having a first set of elements. The apparatus also includes delay units. The ring oscillator is used to generate a clock signal used to measure the delay in signals received at the delay blocks. In the depicted examples, the clock signal generated by the ring oscillator is used to run a counter that counts the delay between a transition in a data signal and a reference signal. Each of the delay units includes a second set of elements matching those of the first set of elements in the ring oscillator. The elements in the set of elements are selected such that they track the period of the ring oscillator signal generated by the ring oscillator. This tracking allows the resolution of the delay adjustment to be as small as the period of the ring oscillator. The delay units are used to implement the desired delay.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a pictorial representation of a data processing system in which the present invention may be implemented depicted in accordance with a preferred embodiment of the present invention;

FIG. 2 is a block diagram illustrating a data processing system in which the present invention may implemented;

FIG. 3 is a diagram illustrating a SCSI system depicted in accordance with a preferred embodiment of the present invention;

FIGS. 4A–4D are timing diagrams illustrating SCSI signals equalized by the present invention depicted in accordance with a preferred embodiment of the present invention;

FIG. 5 is a flowchart of a process used by a host to initiate an equalization process depicted in accordance with a preferred embodiment of the present invention;

FIG. 6 is a flowchart of a process used by a target device to perform an equalization process depicted in accordance with a preferred embodiment of the present invention;

FIG. 7 is a block diagram illustrating an equalization system depicted in accordance with a preferred embodiment of the present invention;

FIG. 8 is a logic diagram of a delay unit depicted in accordance with a preferred embodiment of the present invention;

FIG. 9 is a diagram of a delay depicted in accordance with a preferred embodiment of the present invention;

FIG. 10 is a delay tap multiplexer depicted in accordance with a preferred embodiment of the invention;

FIG. 11 is a logic diagram of a SCSI data input delay counter depicted in accordance with a preferred embodiment of the present invention;

FIG. 12 is a logic diagram of a ring oscillator circuit depicted in accordance with a preferred embodiment of the present invention;

FIG. 13 is a timing diagram of signals used in a delay counter depicted in accordance with a preferred embodiment of the present invention;

FIG. 14 is a block diagram of a delay adjustment calculator depicted in accordance with a preferred embodiment of the present invention;

FIG. 15 is a flowchart of a process used to calculate adjustment values depicted in accordance with a preferred embodiment of the present invention;

FIG. 16 is a diagram illustrating delay adjustment values generated by a delay adjustment calculator depicted in accordance with a preferred embodiment of the present invention; and FIGS. 17A and 17B are timing diagrams of acknowledge and data signals depicted in accordance with a preferred embodiment of the present invention.

DETAILED DESCRIPTION

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface.

The depicted example in FIG. 2 and above-described examples are not meant to imply architectural limitations. For example, data processing system 200 also may be a notebook computer or hand held computer.

Turning now to FIG. 3, a diagram illustrating a SCSI system is depicted in accordance with a preferred embodiment of the present invention. SCSI system 300 may be found within a data processing system, such as data processing system 200 in FIG. 2. In this example, protocol chip 302 is a chip used to send and receive data signals in SCSI system 300. Protocol chip 302 is located on a board 304. A connector 306 provides a connection for cable 308. In turn, cable 308 is connected to SCSI device connector 310, providing a connection to board 312, containing protocol chip 314. The processes of the present invention are implemented in a SCSI device and may be implemented in protocol chip 302 and protocol chip 314 in the depicted examples. In particular, the processes are used to provide the needed time to set up and hold data for latches 316 and protocol chip 302 and latches 318 in protocol chip 314. Latches 316 and latches 318 are part of the circuitry within protocol chip 302 and protocol chip 314 used to receive data from data lines in the SCSI bus.

With reference now to FIGS. 4A–4D, timing diagrams illustrating SCSI signals equalized by the present invention are depicted in accordance with a preferred embodiment of the present invention. These figures illustrate the required set up and hold times for a single data channel. With multiple data channels, the problems illustrated are compounded.

In FIG. 4A, reference signal 400 is illustrated along with a SCSI data signal 402. Reference signal 400 is a SCSI acknowledge (ACKN) signal when data is received at a target device. When data is received at a host, reference signal 400 is a SCSI request (REQN) signal. In this example, reference signal 400 functions as a clock signal. The transition of data signal 402 occur at ideal times for setting up a signal to be held in latches in the protocol chip. In this example, data setup is illustrated by time period t1, while the data hold required is represented by time period t2. The data must be present for a period of time before the clock transition and for a period of time after the clock transition. The period of time that the data must be present at the latches prior to the clock transition is referred to as the "setup" time while the amount of time the data must be present at the latches after the clock transition is referred to as the "hold"

time. This setup and hold time is required to provide enough time for the latches or flip-flops to acquire the data. Otherwise, data errors may occur in latches, such as those in a chip, such as latches 318 in protocol chip 314 in FIG. 3.

In FIG. 4B, uncertainty in the signals is illustrated after the SCSI acknowledge signal and the SCSI data signal are transferred containing chip and board skew when board 312 is the target. Additional uncertainty in the signals is introduced after cable skew is added into acknowledge signal 400 and SCSI data signal 402 as shown in FIG. 4C. The amount of uncertainty in signal 400 and data signal 402 is illustrated in FIG. 4D. As can be seen, data setup time represented by time period t3 and data hold time represented by time period t4 are much smaller than that illustrated in FIG. 4A.

Thus, as can be seen, the skew caused by various sources in transmitting data and signals reduces the data setup and data hold times available to hold data. This skew may be measured and compensated for using delay elements.

The present invention provides a propagation delay and time calibration apparatus. In particular, the present invention uses the same delay elements for both speed calibration and propagation delay. For example, the same inverters, logic gates, and other logic elements. The same elements are used in a ring oscillator and in the circuitry for adjusting signal propagation delay. Delay units for the delay circuitry are formed using the same elements found in the ring oscillator. Each delay unit in the depicted examples below contains cells that are used in measuring the speed through which data passes. This measurement is made using a clock signal generated by the ring oscillator. Additionally, each delay unit may be individually adjusted to a selected delay independently of other delay units. Additionally, the present invention eliminates the physical separation between a ring oscillator and individual delay units. The separation is reduced by placing the ring oscillator near the delay units. Further, mismatches between different data channels are minimized because the delays are adjusted locally in the delay cells in the delay units.

FIGS. 5 and 6 provide a description of an equalization process in which the circuitry of the present invention may be used. FIGS. 9 and 12 illustrate the elements in the delay cell and the ring oscillator of the present invention while FIGS. 7–8, FIGS. 10–11, FIG. 14 and FIG. 15 illustrate the circuitry in which the delay units and the ring oscillator are used.

With reference now to FIG. 5, a flowchart of a process used by a host to initiate an equalization process is depicted in accordance with a preferred embodiment of the present invention. The process illustrated in FIG. 5 is one that may be implemented in a host controller, such as in host bus adapter 212 in FIG. 2. The process begins by initiating a delay equalization phase (step 500). In the depicted example, this phase is initiated during the domain validation performed by the SCSI protocol. Thereafter, the host controller sends a delay measure start command to one or more target devices to initiate delay measurement sequences and the various target devices (step 502). The host controller then performs a synchronous data out transfer (step 504) with the process terminating thereafter. This synchronous data out transfer may include, for example, sending a 00FF or any other suitable data pattern of a specific length to the targets on all of the data channels. This synchronous data out transfer also includes sending an acknowledgement (ACKN) to the targets.

With reference now to FIG. 6, a flowchart of a process used by a target device to perform an equalization process is depicted in accordance with a preferred embodiment of the present invention. The target device may be, for example, disk 226 in FIG. 2. The process begins by the target device receiving a delay start measurement command from a host device (step 600). Thereafter, the target device receives data and acknowledgment signals on all of the data channels to the host device (step 602). The target device will measure the delay from each acknowledgment signal transition to each incoming data input transition (step 604). This measurement may be made with a delay counter, which is described in more detail below. This delay is stored (step 606). Steps 604 and 606 are performed for each data input channel. Each of the delay values is stored in a different latch in these examples.

Thereafter, input delay adjustment values are calculated (step 608). In these examples, the stored count for each input data channel is sent to a delay adjustment calculator block, which performs the calculations necessary to identify input delay adjustment values for the different data channels. These values are sent to an input delay adjust mechanism (step 610) with the process terminating thereafter. This input delay adjust mechanism is described in more detail in FIGS. 7–10 below. In these examples, the adjustment mechanism is located in the protocol chip on the device receiving data using data lines or input channels. The processes illustrated in FIGS. 5 and 6 are equally applicable to provide for skew adjustment in transmitting data from a target to a host. In other words, these process also may be applied to a host receiving data from a target. When adjusting for skew on the host side, the mechanism of the present invention is located in the host.

The input delay adjust block takes the values for each of the data input channels and the acknowledgement input channel for adjusting the delay of the signals. The delay of each individual channel is adjusted to the slowest data channel using a delay chain included in each data channel in accordance with a preferred embodiment of the present invention. The delay chain is described in more detail with respect to FIGS. 8 and 9. The sequence of events illustrated in FIGS. 5 and 6 may be repeated for various types of delay skew adjustment such as coarse and fine. In addition, these processes may be performed at regular time intervals between data transfers for long term delay skew drifts to take in account changes in operating factors, such as temperature and power supply.

With reference now to FIG. 7, a block diagram illustrating an equalization system is depicted in accordance with a preferred embodiment of the present invention. Equalization system 700 is located in a protocol chip, such as protocol chip 302 or 314 in FIG. 3. Equalization system 700 is placed in both target devices and host adapters or controllers in depicted examples. When located in a target device, equalization system 700 is used to equalize delays in data received by the target device. When located in a host, equalization system 700 is used to equalize delays in data sent by a target device.

Equalization system 700 in this example includes an input delay adjustment unit 702 and a delay counter 704 for each input data channel. In the depicted examples, 16 channels are present. Thus, 16 of these input delay adjust and delay counter units are present in equalization unit 700. Input delay adjust unit 702 is connected to a data channel at input 706, which is sent on for processing at output 708. The signal is delayed by some amount of time in which the amount of time is set by input 710. Input 710 is used to receive a delay value for input delay adjust unit 702. This delay in some cases may be zero. Delay counter 704 also receives a delay signal at input 712 as well as an acknowledgement signal at input 714. A measurement of the delay between the transition of the acknowledge signal and the data signal is measured and stored within a latch within delay counter 704. This delay value may be output at output 716 to the delay adjustment calculator 718, which receives at input 720 the delay measurement from output 716 in delay counter 704. In this example, only one input delay adjustment unit is shown for purposes of more clearly describing the invention. In accordance with a preferred embodiment of the present invention, multiple input delay adjustment units may each generate a delay measurement, which is received by delay adjustment calculator 718.

In response to receiving a delay measurement, a delay value is calculated by delay adjustment calculator 718 and sent back to the input delay adjustment unit 702 through output 722 to input 710 in delay adjustment unit 702. Of course, with multiple delay adjustment units, a delay value may be calculated and sent to each delay adjustment unit. In accordance with a preferred embodiment of the present invention, delay adjustment calculator 718 selects a delay for a particular data line or channel by setting the delay value equal for the particular data line equal to the delay of the data line having the longest delay. In this example, only a single delay adjustment calculator is required for multiple input delay adjustment units and delay calculators.

Input delay adjustment unit 702 delays the data signal input at input 706 for some period of time prior to the data appearing at output 708. Further, an input delay adjustment unit, such as input delay adjustment unit 702, is connected to the line providing the acknowledge signal.

With reference now to FIG. 8, a logic diagram of a delay unit is depicted in accordance with a preferred embodiment of the present invention. Delay unit 800 may be implemented in input delay adjustment unit 702 in FIG. 7 to provide a delay for data received from a data line or input channel. Delay unit 800 includes delay 1 802, delay 2 804, delay 3 806, through delay N 808. N may be any number and will vary depending on the implementation. SCSI input data is input into input 810 in delay 1 802. This input corresponds to input 706 in FIG. 7. Outputs for the SCSI data are found at delay tap 1 812, delay tap 2 814, delay tap 3 816, through delay tap N 818. Each of these delays also has an output to another delay except for delay tap N 818 because it is the last delay in the chain.

With reference now to FIG. 9, a diagram of a delay is depicted in accordance with a preferred embodiment of the present invention. In this example, delay 900 includes two delay cells 902 and 904. In this example, cell 902 includes input 906, which is connected to a series of inverters I1–I4. Inverter 14 has its output connected to input of NAND gate A1. The output of NAND gate A1 has its output connected to delay buffer D1. In addition, NAND gate A1 is enabled by upper power supply voltage VDD in this example. Cell 904 in this example has an input connected to the output of NAND gate A1, which is connected to a series of inverters I5–I10. The output of inverter I10 is connected to the input of NAND gate A2. Additionally, this NAND gate is enabled by upper power supply VDD. The output of NAND gate A2 is connected to delay buffer D2, which has its output connected to output 908. The output of NAND gate A2 may be connected to the input of an inverter in another cell.

Input 906 is connected to the SCSI data input if delay 900 is the first delay in the series. Intermediate delays has input 906 connected to the output of a NAND gate in a pervious delay, such as NAND gate A2. Output 908 forms the output for a delay tap in this example. Delay taps may be selected using a selection mechanism, such as a multiplexer.

Turning next to FIG. 10, a delay tap multiplexer is depicted in accordance with a preferred embodiment of the present invention. Delay tap multiplexer 1000 is used to select taps from an input delay adjust unit, such as input delay adjust unit 800 in FIG. 8.

In this example, delay tap multiplexer 1000 includes a SCSI data input 1002 as well as delay tap 1 input 1004, delay tap 2 input 1006, delay tap 3 input 1008 through delay tap N input 1010. N may be any number depending on the implementation. Additionally, input 1012 is used to select the particular delay tap signal that is to be used to delay the signals entering SCSI data input 1002. SCSI data from SCSI data input 1002 is output at output 1014 after the delay selected using input 1012.

With reference now to FIG. 11, a logic diagram of a SCSI data input delay counter is depicted in accordance with a preferred embodiment of the present invention. Data input delay counter 1100 contains a transition detector 1102 and a transition detector 1104. In addition, data input delay counter 1100 also includes a latch 1106, a latch 1108, and a counter 1110. Acknowledge signal is input into input 1112 into transition detector 1102. SCSI data from one of the channels is input into input 1114 into transition detector 1104. Transition detector 1102 and transition detector 1104 are used to detect transitions in the acknowledge and data signal input to input 1112 and 1114, respectively. The detection of a transition results in output signals being generated by the transition detectors. These outputs are input into latch 1106, which is a set-reset (SR) latch in this example.

When a transition occurs in the acknowledge signal applied to input 1112, latch 1106 generates an output that is sent to counter 1110. Additionally, the output of transition detector 1104 is used as an input to latch 1108. Latch 1108 also receives as an input the output of counter 1110. The output 1116 of latch 1108 provides a count containing a measured delay value between the acknowledge signal and data signal into transition detector 1102 and transition detector 1104. The output of transition detector 1102 also provides a reset signal for counter 1110 in which the reset signal resets the count to zero. The enable signal, conten, will start to count the amount of delay between the acknowledge signal and data signal. Counter 1110 is driven by a clock signal input at input 1118, which is a high frequency clock signal in this example. This high frequency clock signal may be generated, for example, by ring oscillator circuit connected to input 1118.

With reference now to FIG. 12, a logic diagram of a ring oscillator circuit is depicted in accordance with a preferred embodiment of the present invention. Ring oscillator circuit 1200 is used to generate a clock signal used to measure delays in data signals received from data lines. Ring oscillator circuit 1200 includes inverters I11–I14, which are hooked up in series. The output of inverter I14 is connected to NAND gate A3. NAND gate A3 also includes an input 1202. This input is configured for receiving a ring oscillator enable signal to enable the output for NAND gate A3. The output of NAND gate A3 is connected to delay buffer D3, which in turn has its output connected to output 1204. This output provides a clock signal into input 1118 in delay counter 1100 in FIG. 11, as described above.

Additionally, the output of NAND gate A3 is also connected to the input of inverter I1. Of course the logic illustrated is for illustrative purposes only. Many different configurations are possible depending on the particular implementation. For example, different number of inverters may be used as well as different types of circuits to provide a ring oscillator output.

In accordance with a preferred embodiment of the present invention, the elements of the ring oscillator circuit in FIG. 12 are identical to the cells in FIG. 9. Each circuit in cell 902 and cell 904 contains elements corresponding to those of ring oscillator circuit 1200 in FIG. 12. Alternatively, another inverter may be used in place of the NAND gate. In the depicted example, two sets of elements matching those of ring oscillator circuit 1200 in FIG. 12 are used in each delay, such as delay 900 in FIG. 9 such that the output at output 908 has a period that is twice the propagation of the four inverters and the NAND gate, which requires the use of two sets of elements matching those of ring oscillator circuit 1200 in FIG. 12. Each ring oscillator cycle requires two passes of a signal edge through the ring oscillator circuit. As a result, the delay is selected to have twice the propagation of the elements in the ring oscillator circuit to have a granularity equal to one clock period of the ring oscillator circuit. The invention matches delays in the delay cells with elements in the ring oscillator. This matching of the delays in the cells with the elements in the ring oscillator reduce or eliminate the effects from process, temperature, voltage variations in the circuit. Different elements may be used as long as the delays are matched. The delay is exactly the same as the delay between tap output points of the input delay adjustment circuit because each of the four inverters, NAND gate, buffer elements used in the delay cell match those in the ring oscillator circuit, in terms of transistor sizes layout, and orientation. Additionally, in accordance with a preferred embodiment of the present invention, the physical location of the input delay adjust circuit is adjacent to or near by the ring oscillator circuit on the chip. In this example, ring oscillator circuit 1200 may be implemented within input delay adjustment unit 702 in FIG. 7. In such a configuration, a ring oscillator circuit is located in each input delay adjustment unit. Alternatively, ring oscillator circuit 1200 may be used to drive all of the delay counters associated with the data lines being equalized in these examples.

The mechanism of the present invention allows for delay adjustments to be made to SCSI data input to a resolution equal to or less than the period of the ring oscillator output. A smaller resolution may be accomplished by using smaller delay elements in the delay cells.

With reference now to FIG. 13, a timing diagram of signals used in a delay counter, such as delay counter 1100 in FIG. 11 is depicted in accordance with a preferred embodiment of the present invention. Acknowledge (ACKN) signal 1300 is the signal input into input 1112 in FIG. 11. SDN signal 1302 is the SCSI data signal input into input 1114 in FIG. 11. Set signal 1304 is the signal generated by transition detector 1102 used to reset counter 1110 in FIG. 11. Clear signal 1306 is the clear signal generated by transition detector 1104 that is input into latch 1106. Next, conten signal 1308 is the output of SR latch 1106 in FIG. 11. HFC signal 1310 is the high frequency clock signal input into input 1118 in FIG. 11. Count signal 1312 is the value generated by latch 1108 at output 1116.

Still referring to FIG. 13, a transition from high to low of acknowledge signal 1300 initiates a generation of set signal 1304 by transition detector 1102 in FIG. 11. This signal sets latch 1106 in FIG. 11 to high, which makes the output of latch 1106, conten signal 1308, to become high. As a result, counter 1110 is enabled. When a data signal, such as SDN signal 1302 becomes high, a clear signal 1306 is generated by transition detector 1104. This clear signal resets latch 1106 causing conten signal 1308 to go low and stop counter 1110. This clear signal also causes latch 1108 to load the value of counter 1110. Counter 1110 increments by 1 for each high frequency clock pulse as shown in HFC signal 1310.

With reference now to FIG. 14, a block diagram of a delay adjustment calculator is depicted in accordance with a preferred embodiment of the present invention. Delay adjustment calculator 1400 includes a microcontroller 1402, which performs operations using a delay calculation program located in memory 1404. The program may be accessed by microcontroller 1402 using program address bus 1406. Operation codes, also referred to as "opcodes", are returned to microcontroller 1402 by memory 1404 using opcode bus 1408. Delay counts are obtained from memory map registers 1410 using data address bus 1412 and data bus 1414. Calculated delay adjustment values are returned to memory mapped registers 1410.

With reference now to FIG. 15, a flowchart of a process used to calculate adjustment values is depicted in accordance with a preferred embodiment of the present invention. The processes in FIG. 15 may be implemented in a program located in memory 1404 in FIG. 14 and executed by microcontroller 1402 in FIG. 14.

The process begins by reading delay count values for all SCSI data inputs (step 1500). The delay count value is obtained for each data line or channel in step 1500. Next, a maximum delay count value is identified (step 1502). An adjust delay value is selected for each data line or channel that is equal to the maximum delay count minus the delay count for the data line or channel (step 1504). Using step 1504, each of the data lines or channels may have their delays adjusted to equal the maximum delay count value. In this way, all of the data lines may be set to have the same delay. Then, the adjust delay value for the reference signal, ACKN, is set equal to the maximum delay count minus one half of the transfer period (step 1506) with the process terminating thereafter. Step 1506 is used to set or adjust the reference signal such that the transition in the signals on the data lines or channels occur in the middle of a pulse for the reference signal.

FIG. 16 is a table illustrating delay adjustment values generated by a delay adjustment calculator depicted in accordance with a preferred embodiment of the present invention. These delay adjustment values are those that are generated by delay adjustment calculator, such as delay adjustment calculator 1400 in FIG. 14. These outputs are generated in response to various delay count inputs for different channels. The delay count values are the inputs, such as input 720 in FIG. 7, while the delay adjustment values are those output such as output 722 in FIG. 7. The outputs illustrated in FIG. 16 are calculated using the process depicted in the flowchart of FIG. 15.

With reference now to FIGS. 17A and 17B, timing diagrams of acknowledge and data signals are depicted in accordance with a preferred embodiment of the present invention. Acknowledge signal 1700 and data signal 1702 are examples of signals prior to timing adjustment using the mechanism of the present invention. As can be seen, the transition of acknowledge signal 1700 with respect to data signal 1702 provides a large area of uncertainty in which data may not be valued as illustrated in sections 1704–1710. After measuring delays and providing delay adjustment values, acknowledge signal 1712 in FIG. 17B is adjusted as shown. As a result of the adjustments to the acknowledged signal and the data signals, the regions of uncertainty in data signal 1714 are smaller as can be seen in sections 1716–1722.

Thus, the present invention provides a delay calibration mechanism in which elements used for speed calibration of signals are matched for setting the propagation delay. For example, a central ring oscillator circuit is used to provide a clock signal for measuring delay in an equalization circuit such as counter 1110 in FIG. 11. The elements in the central ring oscillator are matched with elements used to provide the selected delay, such as the elements in cell 902 and cell 904 in FIG. 9.

In the depicted examples, the delay cells in an input adjustment unit may be used to independently calibrate and adjust the input adjustment unit independently of other input adjustment units. Further, the calibration provided by the illustrated circuits are localized for each channel or line. Also in these examples, the use of ring oscillators allows for generating time steps less than 100 pico seconds. The absolute calibration of the channels may be performed by an external clock source, such as, for example, a crystal oscillator driving the counters.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application of the invention, and to enable others of ordinary skill in the art to understand the invention for various embodiments with various modifications as are suited to the particular use contemplated.

What is claimed is:

1. A method for providing a delay in a digital circuit, the method comprising:
   providing a first set of digital elements to form a clock generation circuit;
   providing a delay unit, wherein the delay unit includes a plurality of delay elements, each one of the plurality of delay elements including a second set of digital elements identical to the first set of digital elements, the delay unit being configured to receive a digital signal from a line, each one of the plurality of delay elements being a clock generation circuit;
   measuring a delay of the digital signal using the clock generation circuit and the second set of digital elements; and
   implementing a delay using the delay unit in response to measuring the digital signal.

2. The method of claim 1 further comprising:
   providing a counter; and
   coupling the delay unit and the clock generation circuit to the counter;
   providing, from the delay unit, the digital signal to the counter; and
   providing, from the clock generation circuit a digital clock signal to the counter, wherein the digital clock signal is used by the counter as the counter's clock.

3. The method of claim 2, wherein the digital signal is a data signal and further comprising applying a reference digital clock signal to the delay counter, wherein the counter measures a delay between the reference digital clock signal and the data signal.

4. The method of claim 3, wherein the reference digital clock signal is an acknowledge signal.

5. The delay circuit of claim 2, wherein the second set of digital elements are selected to generate outputs that track a period of the reference digital clock signal.

6. The method of claim 1, wherein the clock generation circuit is a ring oscillator circuit.

7. The method of claim 1, wherein the line is a data line.

8. The method of claim 1, wherein the line is a small computer system interface data line.

9. The method according to claim 1, further comprising each one of the plurality of delay elements being a ring oscillator.

10. A delay circuit comprising:
    a ring oscillator circuit including a first set of digital elements, wherein the ring oscillator generates a clock signal;
    a delay unit, wherein the delay unit includes a second set of digital elements matching the first set of digital elements and is configured to receive a digital signal from a line, wherein a delay for the digital signal is selected for the delay unit using measurements based on the clock signal from the ring oscillator circuit; and
    a counter coupled to the delay unit and ring oscillator;
    the counter receiving as its inputs the digital signal, a reference clock signal, and the clock signal from the ring oscillator; and
    the counter using the clock signal from the ring oscillator as the counter's clock.

11. The delay circuit of claim 10, wherein the first set of digital elements are identical to the second set of digital elements.

12. The delay circuit of claim 10, wherein the second set of digital elements are selected to generate outputs that track a period of the clock signal.

13. The delay circuit of claim 10, wherein the second set of digital elements includes a number of elements equal to an integer multiple of the first set of digital elements.

14. The delay circuit of claim 10, wherein the ring oscillator circuit comprises:
    a first set of inverters, said first set including a plurality of inverters connected in series, said first set having an input end and an output end;
    a first NAND gate having a first input, a second input, and an output, wherein the first input is connected to the output end of the first set of inverters, the second input is adapted to receive a signal, and the output is connected to the input end of the first set of inverters; and
    a buffer having an output and an input, wherein the input is connected to the output of the first NAND gate and the output generates a clock signal,
    wherein the delay unit includes at least two cells in which each cell includes:
        a second set of inverters connected in series having an input end and an output end, wherein the second set of inverters is a number of inverters equal to the plurality of inverters included in the first set of inverters;
        a second NAND gate having a first input, a second input, and an output, wherein the first input is connected to the output end of the second set of inverters, the second input is adapted to receive a signal, and the output is connected to the input end of the first set of inverters; and
        a buffer having an output and an input, wherein the input is connected to the output of the second NAND gate, wherein in a second cell in the two cells, the output of the buffer forms a tap;

wherein a set of taps are formed and a tap from the set of taps is used to select the delay for the digital signal.

15. The delay circuit of claim 10, wherein the ring oscillator and the delay unit are located on a chip.

16. A delay circuit comprising:
   a ring oscillator comprising a first set of digital elements, said ring oscillator producing a digital clock output signal;
   a delay counter that receives as its inputs the digital clock output signal from the ring oscillator, an input signal, and a digital reference signal, the digital clock output signal being used by the delay counter as its clock signal;
   a plurality of delay units, wherein each of the plurality of delay units includes a second set of digital elements matching the first set of digital elements.

17. The delay circuit of claim 16, wherein the ring oscillator comprises:
   a first set of inverters that includes a plurality of inverters connected in series, the first set having an input end and an output end;
   a first NAND gate having a first input, a second input, and an output, wherein the first input is connected to the output end of the first set of inverters, the second input is adapted to receive a signal, and the output is connected to the input end of the first set of inverters; and
   a buffer having an output and an input, wherein the input is connected to the output of the first NAND gate and the output generates a clock signal.

18. The delay circuit of claim 17, wherein each delay unit includes two cells and wherein each cell comprises:
   a second set of inverters connected in series, the second set of inverters having an input end and an output end, wherein the second set of inverters is a number of inverters equal to the plurality of inverters included in the first set of inverters;
   a second NAND gate having a first input, a second input, and an output, wherein the first input is connected to the output end of the second set of inverters, the second input is adapted to receive a signal, and the output is connected to the input end of the second set of inverters; and
   a buffer having an output and an input, wherein the input is connected to the output of the second NAND gate.

19. The delay circuit of claim 16, wherein each of the plurality of delay units includes two cells, wherein each cell includes a set of digital elements identical to the first set of digital elements.

20. The delay circuit of claim 16, wherein the plurality of delay units has an input configured for connection to a data line.

21. A computer system comprising:
   a plurality of channels;
   a first device connected to the plurality of channels;
   a second device connected to the plurality of channels
   a delay apparatus, wherein the delay apparatus connects the second device to the plurality of channels, wherein the delay apparatus includes:
      a ring oscillator circuit that includes a plurality of digital elements;
      a plurality of delay adjustment units, wherein each delay adjustment unit includes:
         an input connected to a channel within the plurality of channels; and
         a set of delays connected in series in which each delay in the set of delays includes at least one set of digital elements in which each set of digital elements is identical to the plurality of digital elements included within the ring oscillator, wherein the set of delays has an input and a set of taps, wherein a tap from the set of taps is selected to set a delay for the adjustment unit.

22. The computer system of claim 21, wherein the ring oscillator circuit and the set of delays are used to measure delay in a digital signal on a channel from the plurality of channels.

23. The computer system of claim 21, wherein the delay apparatus further includes:
   a multiplexer having a plurality of inputs connected to the set of taps, wherein a delay is set by selecting a tap using the multiplexer.

24. The computer system of claim 21, wherein the plurality of channels form a bus.

25. The computer system of claim 21, wherein the plurality of channels form a small computer system interface bus.

26. The computer system of claim 21, wherein the ring oscillator circuit comprises:
   a first set of inverters that includes a plurality of inverters connected in series, the first set having an input end and an output end;
   a first NAND gate having a first input, a second input, and an output, wherein the first input is connected to the output end first set, the second input is adapted to receive a signal, and the output is connected to the input end first set; and
   a buffer having an output and an input, wherein the input is connected to the output of the first NAND gate and the output generates a clock signal,
   wherein each delay in the set of delays includes a two cells in which each cell includes:
      a second set of inverters connected in series having an input end and an output end, wherein the second set of inverters is a number of inverters equal to the plurality of inverters included in the first set of inverters;
      a second NAND gate having a first input, a second input, and an output, wherein the first input is connected to the output end of the second set of inverters, the second input is adapted to receive a signal, and the output is connected to the input end of the second set of inverters; and
      a buffer having an output and an input, wherein the input is connected to the output of the second NAND gate, wherein in a second cell in the two cells, the output of the buffer forms a tap,
   wherein a set of taps are formed and a tap from the set of taps is selected to select a delay for the signal.

* * * * *